UNITED STATES PATENT OFFICE.

ALBERT E. GUY, OF TRENTON, NEW JERSEY, ASSIGNOR TO DE LAVAL STEAM TURBINE COMPANY, OF NEW YORK, N. Y., A CORPORATION OF NEW JERSEY.

MOTOR.

No. 908,662.  Specification of Letters Patent.  Patented Jan. 5, 1909.

Application filed April 30, 1908. Serial No. 430,046.

*To all whom it may concern:*

Be it known that I, ALBERT E. GUY, a citizen of the United States of America, and a resident of Trenton, county of Mercer, and State of New Jersey, have invented certain new and useful Improvements in Motors, of which the following is a specification.

My invention relates to improvements in motors, and particularly to high speed motors such as axial flow steam turbines, direct impact hydraulic motors, and the like, and consists in a power unit comprising a plurality of high speed motors operating driving shafts upon which are pinions driving speed-reducing gears, each pinion driving two such gears, one of such gears being common to the pinions of two adjacent motors.

Various practical considerations limit the desirable diameter of the rotating member of very high speed motors, such as certain types of steam turbines, direct impact water wheels and the like; and to utilize such motors in large power units it is preferable to employ a plurality of such motors operating in parallel or series, rather than to provide a single larger motor which, because of its greater size, must operate at a lower rotative speed. These high speed motors usually comprise, as a part of them, reducing gearing, the main driving shaft or shafts of the motor not being driven directly by the rotating element of the motor, but being driven through this gearing. In such cases large powers may be obtained with economy in construction, operation, and space occupied, by providing a plurality of the motors arranged preferably side by side and driving, through their reducing gear, one or a plurality of relatively low speed driving shafts, one gear of the reducing gearing of any two adjacent motors being possessed by such two motors in common; which arrangement not only has the advantage of causing the two motors to operate at corresponding speeds and to carry corresponding loads, but involves a less number of gears than would be required if the motors were entirely independent; and the resulting duplex, triplex, etc., motor unit is, to all intents and purposes, as truly a single unit as if all of the rotating parts of the several motors were on a single shaft, while the complications that would attend the placing of so many rotating parts upon a single high speed shaft, are obviated.

In the accompanying drawings I illustrate such a power unit.

Figure 1:
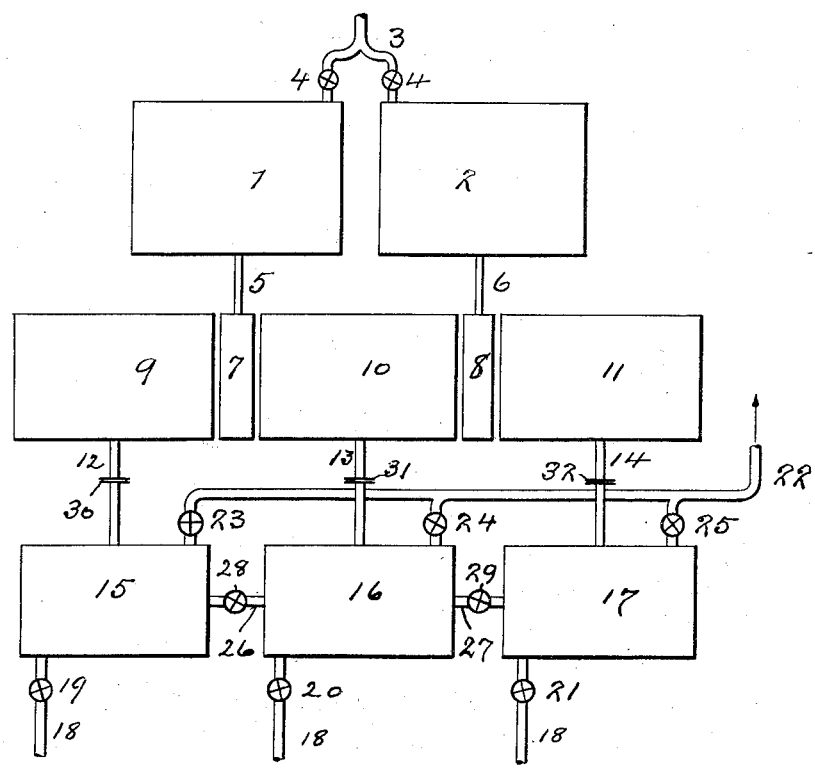
Figure 2:
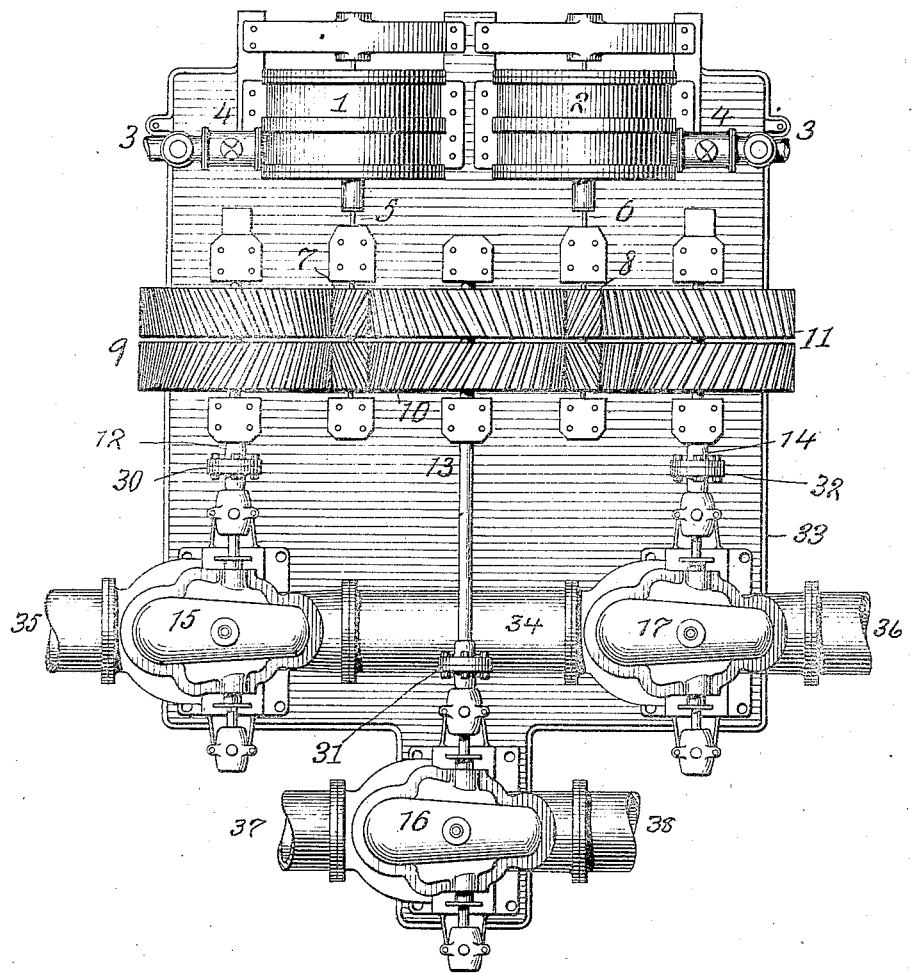

In said drawings: Figure 1 is a diagrammatic plan view illustrating purely diagrammatically the layout of such a power unit as applied to the driving of a plurality of centrifugal pumps, and also illustrates different ways of connecting these pumps together, according to requirements of particular conditions. Fig. 2 is a plan view of such a power unit and pump unit showing the parts approximately as they would appear in actual use.

It is obvious that according to the method of combining in a single power unit a plurality of high speed rotary motors, there may be any desired number of such motors arranged in parallel and driving, through suitable gearing, the same or corresponding low speed shafts. In the drawings I show a unit comprising only two such motors, but it will be obvious that the number might be greater and that by illustrating a unit comprising only two such motors I do not in any way limit myself so far as the use of a greater number of motors is concerned.

In the drawings, 1 and 2 designate similar rotary motors, for example, high speed steam turbines; and 3 designates a pipe for supplying working fluid to such motors and 4, 4 throttle valves therefor. 5 and 6 designate the high speed shafts of such motors, said shafts customarily carrying the rotating driving members (not shown), and 7, and 8 designate gear pinions mounted upon shafts 5 and 6 respectively, and driving reducing gears 9, 10 and 11; these gears being upon shafts 12, 13 and 14 respectively.

Since each pinion 7 or 8 drives two opposite gear wheels 9 and 10, or 10 and 11, as the case may be, side pressure of one of these gears upon the pinion is neutralized by the opposite and equal side pressure of the other gear, and since gear 10 is driven directly by both pinions, 7 and 8, only one gear is required to balance, as to these two pinions, the side pressures produced by gear 9, with respect to pinion 7, and gear 11, with respect to pinion 8. Moreover, since both pinions drive the same gear 10, both motors, 1 and 2, must operate at corresponding speeds and must act in all respects as if they were in fact one single motor.

It will be seen that in such a unit there are three shafts, 12, 13 and 14, from any one or more, or all, of which power may be taken off. In many cases this possession of a plurality of parallel driving shafts operating at corresponding speeds and always working in synchronism, is highly desirable. For example, in the operation of centrifugal pumps, by operating a plurality of centrifugal pumps in series, it is practicable to work efficiently against high heads; also where large delivery against low heads is desired, a plurality of relatively small centrifugal impellers operate on the whole more efficiently than a single impeller of larger size.

In Fig. 1 I have indicated, purely diagrammatically, three centrifugal pumps, 15, 16 and 17, the shafts of which are connected to shafts 12, 13 and 14 respectively, by suitable couplings 30, 31 and 32 respectively; and I have indicated said pumps as provided with supply connections 18 having control valves 19, 20 and 21 respectively, and have shown a discharge pipe 22 with which the three pumps are connected in parallel through discharge valves 23, 24 and 25 respectively, and have also shown pumps 15 and 16 connected by pipe 26 having in it a shut off valve 28 and pumps 16 and 17 connected by a pipe 27 having in it a shut off valve 29. It will be obvious that this arrangement permits the connection of the three pumps 15, 16 and 17 to discharge pipe 22 either in parallel (valves 28 and 29 being closed in such case and valves 23, 24 and 25 open) or in series (valves 28 and 29 being open in such case and valves 20, 21 23 and 24 being closed). It will be obvious that various other power utilizing devices may be driven by the motor unit in the same manner. It will also be obvious that any one of such power utilizing devices may be operated alone, the entire power of all the motors being transmitted to it, if desired, through the gearing.

In Fig. 2 I have illustrated in plan the layout shown in Fig. 1, as it would appear in actual practice, except that I have not indicated a connection from pump 16 to the other two pumps and I have shown pumps 15 and 17 connected in series and have not shown valves such as indicated diagrammatically in Fig. 1. In this figure, as in Fig. 1, 1 and 2 represent rotary fluid pressure motors of high speed type supplied with working fluid through pipes 3 controlled by throttle valves 4, said motors driving by means of their shafts 5 and 6, the helical pinions 7 and 8 intermeshing with the helical gears 9, 10 and 11 on shafts 12, 13 and 14. 15, 16 and 17 designate the said pumps driven from shafts 12, 13 and 14 through coupling 30, 31 and 32 respectively. In this case I have shown pumps 15 and 17 connected in series, 35 being the supply pipe to pump 15, 34 the pipe conveying the discharge from pump 15 to the intake of pump 17, and 36 the discharge pipe from pump 17. 37 designates the supply pipe of pump 16 and 38 the discharge pipe thereof.

In cases where it is desired to take off all the power from one shaft, I may of course omit gearing not required to transmit power directly to said shaft. For example, if it is desired to take off all the power from shaft 13, gears 9 and 11 may be omitted, both pinions 7 and 8 meshing with gear 10.

What I claim is:—

1. A power unit comprising in combination a plurality of high speed rotary motors, a number of low speed shafts greater by one than the number of such motors, and gears on such low speed shafts and pinions driven directly by said motors and each driving directly two of such gears, adjacent motors driving in common one of said gears.

2. The combination with a power unit comprising a plurality of rotary high speed motors, of a plurality of power utilizing devices greater in number by one than the number of such motors, said power utilizing devices each having a gear wheel and each motor driving directly a pinion located between and driving two of such gears, adjacent motors driving in common one of such gears, and connections whereby said power utilizing devices may be operated either in series or in parallel.

3. A power unit comprising in combination a plurality of relatively independent high speed rotary motors, each provided with controlling means independent of the controlling means of the rest, a low speed shaft and a reducing gear on said shaft and pinions in driving connection therewith and directly driven by said motors.

4. The combination with a power unit comprising a plurality of relatively independent high speed rotary motors, each provided with controlling means independent of the controlling means of the rest, a low speed shaft and a reducing gear on said shaft and pinions in driving connection therewith and directly driven by said motors, of a power utilizing device driven by said low speed shaft.

5. The combination with a power unit comprising a plurality of rotary high speed motors, a plurality of low speed shafts and gears on such low speed shafts and pinions driven directly by said motors and driving said gears, and together comprising a gear train whereby any one of said motors may drive all of said low speed shafts, of a plurality of power utilizing devices each driven from one of said low speed shafts.

6. A power unit comprising in combination a plurality of high speed rotary motors, a plurality of low speed shafts and gears on such low speed shafts and pinions driven directly by said motors and driving such gears, the pinions of two adjacent motors driving directly the same gear, one or more of such low speed shafts constituting a drive shaft of the power unit.

In testimony whereof I have signed this specification in the presence of two subscribing witnesses.

ALBERT E. GUY.

Witnesses:
H. M. MARBLE,
FRANK E. RAFFMAN.